United States Patent
Saenger Nayver et al.

(10) Patent No.: US 10,101,583 B2
(45) Date of Patent: Oct. 16, 2018

(54) HEADS UP DISPLAY SYSTEM

(71) Applicant: Gentex Corporation, Zeeland, MI (US)

(72) Inventors: Mario F. Saenger Nayver, Zeeland, MI (US); George A. Neuman, Holland, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/184,254

(22) Filed: Jun. 16, 2016

(65) Prior Publication Data

US 2016/0370586 A1  Dec. 22, 2016

Related U.S. Application Data

(60) Provisional application No. 62/180,386, filed on Jun. 16, 2015, provisional application No. 62/205,376, filed on Aug. 14, 2015.

(51) Int. Cl.
*G02B 27/01* (2006.01)
*G02F 1/157* (2006.01)
(Continued)

(52) U.S. Cl.
CPC .......... *G02B 27/0101* (2013.01); *G02B 5/23* (2013.01); *G02F 1/13439* (2013.01);
(Continued)

(58) Field of Classification Search
CPC ........ G02B 27/0101; G02B 2027/0118; G02F 1/157; G02F 1/13439; G02F 1/133555
(Continued)

(56) References Cited

U.S. PATENT DOCUMENTS 6,864,927 B1  3/2005 Cathey
6,979,499 B2  12/2005 Walck et al.
(Continued)

FOREIGN PATENT DOCUMENTS

DE  102012019506 A1  4/2014
EP     2131227 A1    9/2009
(Continued)

OTHER PUBLICATIONS

International Searching Authority, Notification of Transmittal of the International Search Report and The Written Opinion of The International Searching Authority, or the Declaration, Apr. 14, 2016, 11 pages, Federal Institute of Industrial Property, Russia.

*Primary Examiner* — Jack Dinh
(74) *Attorney, Agent, or Firm* — Price Heneveld LLP; Bradley D. Johnson

(57) ABSTRACT

An electro-optic assembly configured to be operably connected to a heads up display system of a vehicle is provided that includes a first substrate with a first surface, a second surface, and a second substrate with a third surface and a fourth surface. The first substrate and the second substrate are configured to be held in a parallel spaced apart relationship and sealed around a perimeter of the first and second substrates. An antireflection coating is positioned on the third surface of the second partially reflective, partially transmissive substrate. A transflective coating is positioned on at least one of the first and second surfaces and an electrochromic medium is positioned between the second surface of the first substrate and the third surface of the second substrate. The electro-optic assembly is configured to reflect an image from a projector of the heads up display system of the vehicle.

23 Claims, 7 Drawing Sheets

(51) Int. Cl.
*G02F 1/1343* (2006.01)
*G02F 1/1335* (2006.01)
*G02B 5/23* (2006.01)
*G02B 1/115* (2015.01)

(52) U.S. Cl.
CPC ........ *G02F 1/133555* (2013.01); *G02F 1/157* (2013.01); *G02B 1/115* (2013.01); *G02B 2027/0118* (2013.01)

(58) Field of Classification Search
USPC ....................................................... 359/274
See application file for complete search history.

(56) References Cited

U.S. PATENT DOCUMENTS

| | | |
|---|---|---|
| 2002/0196518 A1 | 12/2002 | Xu et al. |
| 2005/0200934 A1 | 9/2005 | Callahan et al. |
| 2006/0066508 A1 | 3/2006 | Walck et al. |
| 2008/0218434 A1 | 9/2008 | Kelly et al. |
| 2010/0097469 A1 | 4/2010 | Blank et al. |

FOREIGN PATENT DOCUMENTS

| | | |
|---|---|---|
| FR | 2922328 A1 | 4/2009 |
| GB | 2368403 | 5/2002 |
| WO | 0023826 A2 | 4/2000 |
| WO | 2009146837 A1 | 12/2009 |

HEADS UP DISPLAY SYSTEM

CROSS-REFERENCE TO RELATED APPLICATIONS

This application claims the benefit of and priority to U.S. Provisional Patent Application No. 62/180,386, filed on Jun. 16, 2015, entitled "ELECTRO-OPTIC ASSEMBLY," and U.S. Provisional Patent Application No. 62/205,376, filed on Aug. 14, 2015, entitled "ELECTRO-OPTIC ASSEMBLY," the entire disclosures of which are hereby incorporated herein by reference.

FIELD OF THE DISCLOSURE

The present disclosure generally relates to an electro-optic assembly, and more particularly, to a heads up display having an electro-optic assembly.

SUMMARY OF THE DISCLOSURE

According to one aspect of the present disclosure, an electro-optic assembly that is configured to be operably connected to a heads up display system of a vehicle is provided that includes a first substrate with a first surface and a second surface and a second substrate with a third surface and a fourth surface. The first substrate and the second substrate are configured to be held in a parallel spaced apart relationship and sealed around a perimeter of the first and second substrates. A transflective coating is positioned on at least one of the first and second surfaces of the first substrate. An antireflective electrode is positioned on at least one of the second and third surfaces. An antireflection coating is positioned on the fourth surface. An electrochromic medium is positioned between the second surface of the first substrate and the third surface of the second substrate. The electro-optic assembly is configured to reflect an image from a projector of the heads up display system of the vehicle.

According to another aspect of the present disclosure, an electro-optic assembly that is configured to be operably connected to a heads up display system of a vehicle is provided that includes a first substrate with a first surface and a second surface and a second substrate with a third surface and a fourth surface. The first substrate and the second substrate are configured to be positioned in a parallel spaced apart relationship and sealed along a perimeter of the first and second substrates. A transflective coating is positioned on at least one of the first and second surfaces. The transflective coating has a low absorption layer and at least a first metal layer. An electrochromic medium is positioned between the second surface of the first substrate and the third surface of the second substrate. The reflectance is substantially non-varying. The electro-optic assembly is configured to control a transmittance from a clear state to a darkened state and the electro-optic assembly is configured to reflect an image from a projector of the heads up display system of the vehicle.

According to yet another aspect of the present disclosure, an electro-optic assembly is provided that includes a substrate defining a first surface and a second surface. A transflective layer is positioned on the first surface of the first substrate. The transflective layer has a metal-dielectric-metal (MDM) structure with a reflectance between about 15% and 35%. A second substrate defines a third surface and a fourth surface. An antireflective electrode is positioned on the second surface of the first substrate and the third surface of the second substrate. The antireflective electrode has a transparent conducting oxide and an antireflection coating on the fourth surface of the second substrate. An electrochromic medium is positioned between the second surface of the first substrate and the third surface of the second substrate and is operable between a clear state and a darkened state. A reflectance from the antireflection coating and antireflective electrode are each less than 1%. A clear state transmittance is between about 24% and 45% and a darkened state transmittance is less than about 7.5%. The electro-optic assembly is configured to be operably connected to a heads up display system for a vehicle.

These and other features, advantages, and objects of the present disclosure will be further understood and appreciated by those skilled in the art by reference to the following specification, claims, and appended drawings.

DETAILED DESCRIPTION

Figure 1:
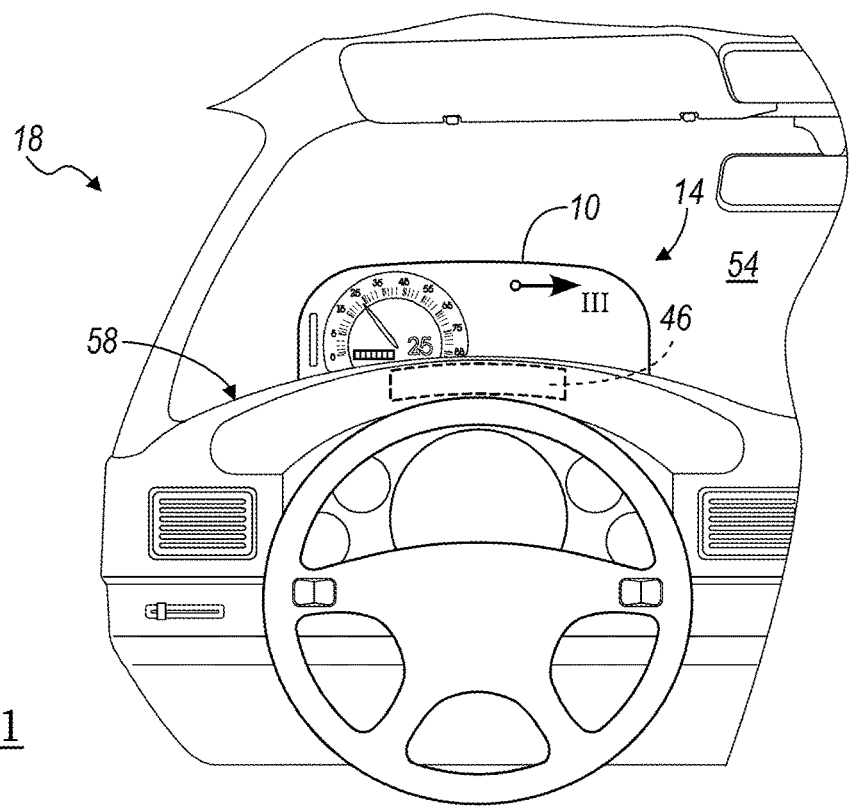
FIG. 1 is a front perspective view of a heads up display system incorporating an electro-optic-element, according to one example.

The present illustrated embodiments reside primarily in combinations of method steps and apparatus components related to an electro-optic assembly, more particularly, a heads up display system having an electro-optic assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the element closer to an intended viewer of the electro-optic heads up display assembly, and the term "rear" shall refer to the surface of the element further from the intended viewer of the electro-optic heads up display system. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
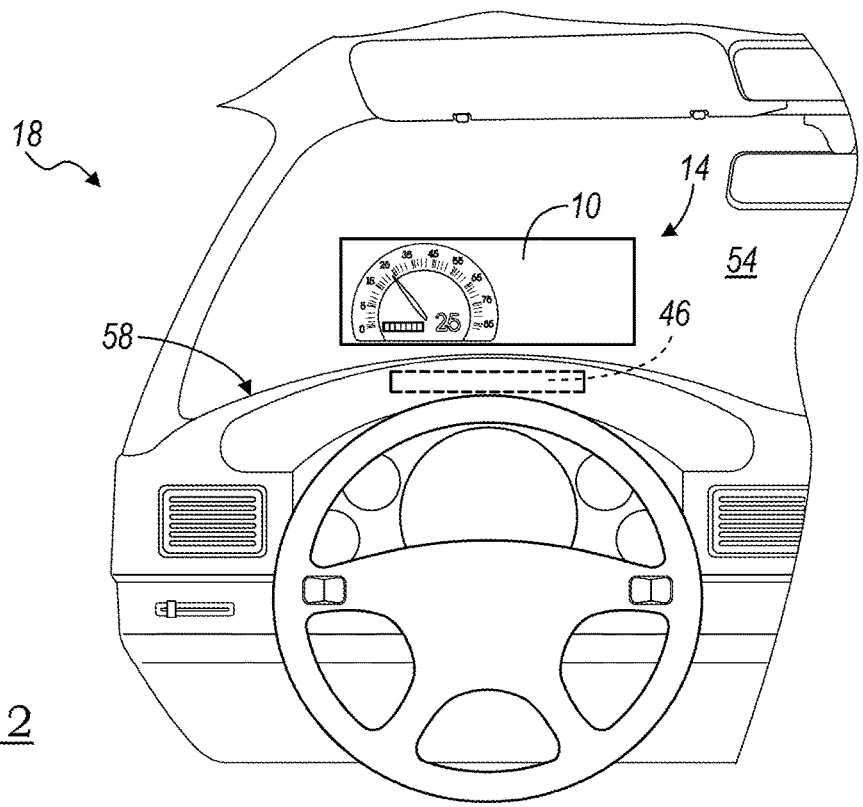
FIG. 2 is a front perspective view of a heads up display system incorporating an electro-optic-element, according to another example.
Figure 3:
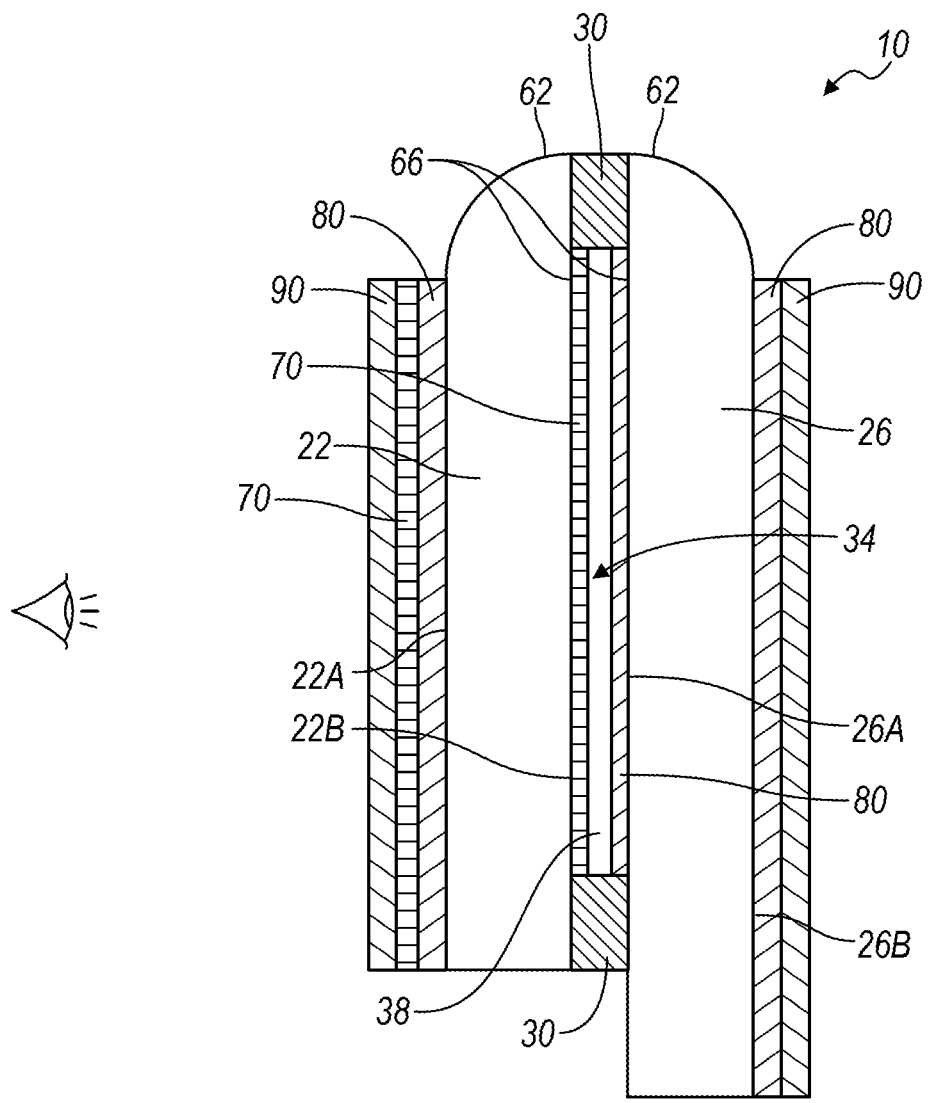
FIG. 3 is a cross-sectional view of the electro-optic assembly of FIG. 1 across line III.

In regards to FIGS. 1-3, reference numeral 10 generally designates an electro-optic assembly. The electro-optic assembly 10 may be utilized in a heads up display system 14 of a vehicle 18. The electro-optic assembly 10 can have a first partially reflective, partially transmissive glass substrate 22 and a second partially reflective, partially transmissive glass substrate 26. The first substrate 22 can have a first surface 22A and a second surface 22B. The second substrate 26 can have a third surface 26A and a fourth surface 26B. The first and second substrates 22, 26 can be positioned in a parallel spaced-apart relationship and can have a seal 30 substantially around a perimeter of the first and second substrates 22, 26. The first substrate 22 and the second substrate 26 define a cavity 34. An electro-optic medium 38 is in the cavity 34 between the first and second substrates 22, 26. In at least one example, the electro-optic assembly 10 is configured to have a non-varying reflectance and a varying transmittance. A "clear state" of the electro-optic assembly 10 refers to the condition of maximum transmittance. The activation of the electro-optic medium 38 may reduce the transmittance of the electro-optic assembly 10 to a "darkened state". The "low end" transmittance refers to the minimum transmittance attainable by the electro-optic assembly 10.

By way of explanation and not limitation, the electro-optic assembly 10 can be included in the heads up display (HUD) system 14 of the vehicle 18. In such an example, the electro-optic element 10 may function as a combiner screen to reflect a primary image projected by a projector 46. The electro-optic assembly 10 can be controlled to vary the amount of light transmission based on input from a control circuit. For example, in daylight conditions the electro-optic assembly 10 may be darkened to improve or increase the contrast ratio and allow for improved visibility of information projected on the electro-optic assembly 10 from the projector 46. The contrast ratio may represent the ratio of a primary reflected image from the projector 46 and the light transmitted through the electro-optic assembly 10 (e.g., in either the clear state or the darkened state).

The heads up display system 14 is capable of use in a variety of applications, such as automotive and aerospace applications, to present information to a driver or pilot while allowing simultaneous forward vision. In some examples the heads up display system 14 may be provided vehicle rearward of a windscreen 54 and protruding from an instrument panel 58 (FIG. 1) while in other examples the electro-optic assembly 10 may be positioned directly on the windscreen 54 (FIG. 2). The electro-optic assembly 10 may be any size, shape, bend radius, angle or position. The electro-optic assembly 10 can be used to display many vehicle related functions or driver assistance systems such as alerts, warnings or vehicle diagnostics. In the depicted examples, the speed of the vehicle 18 is being displayed on the electro-optic assembly 10.

In regards to heads up display systems 14, the image projected onto the electro-optic assembly 10 should be bright enough to see in any condition. This is particularly challenging when the lighting outside the vehicle 18 is bright. The contrast between the light from the projector 46 and the lighting behind the electro-optic assembly 10 can be low on a bright sunny day. While a brighter, more intense lighting source (e.g., the projector 46) improves the contrast, increasing the display brightness may not be the most economical solution and a display that is bright enough to provide reasonable contrast in very bright daylight conditions will be too bright in other conditions. Although controls may be used to deal with variations in brightness, the specific background is ever changing in a moving vehicle, and depends in part on the position of the driver's eyes. In accordance with one example, the electro-optic assembly 10 can be configured to lower the transmission and/or to increase the contrast ratio.

Depending on the application, there may be a need for a higher or lower transmittance in the clear state, different reflectance values for optimal contrast ratios, and/or broader dynamic range of the transmittance levels. The initial reflectance and range of transmittance properties is further complicated by the capabilities of the projector 46 employed with the heads up display system 14 and the light output capabilities of the projector 46 along with the light transmittance levels for the windscreen 54. The windscreen 54 will have a direct impact on the contrast ratio and visibility of the image from the heads up display system 14. There are a number of factors which affect the transmittance levels of the windscreen 54. The minimum light transmittance is based on the rules in the location in which the vehicle 18 is sold but higher transmittance levels may be present based on how the vehicle 18 is equipped and marketed. This range of factors creates the need for solutions which can be adapted to different vehicle and environmental conditions.

Another aspect that should be considered when utilizing the heads up display system 14 is a secondary reflection from the first through fourth surfaces 22A-26B of the first and second substrates 22, 26. Reflection off of the first through fourth surfaces 22A-26B may create a double image effect from secondary reflections that do not perfectly align with the primary reflected image (e.g., due to geometries of the components of the electro-optic assembly 10). The double image that may be formed from secondary reflections off of the first through fourth surfaces 22A-26B may cause the primary image projected by the projector 46 and reflected by the electro-optic assembly 10 to appear blurry or unclear.

According to one example, the electro-optic assembly 10 can be assembled using two approximately 1.6 mm glass substrates (e.g., the first and second substrates 22, 26) which are both bent with a spherical radius of approximately 1250 mm. Other thicknesses for the first and second substrates 22, 26. In other examples the first and second substrates 22, 26 may be bent to have a "free-form" shape. The desired shape is one in which the resultant primary reflected image "appears" to be forward of the electro-optic assembly 10 and forward of the vehicle 18. The exact surface contour needed to attain this characteristic is a function of the properties of the projector 46, projector 46 and driver location, as well as the electro-optic assembly 10 location relative to the other two locations. Having the image projected forward of the vehicle 18 allows the driver to obtain the desired information without having to change their focal distance. In a traditional heads up display located within the vehicle 18, the driver's eyes often have to refocus to the shorter viewing distance thus decreasing the time spent viewing the road. Furthermore, the driver's eyes will also then have to re-focus on the road ahead, which further decreases the time spent viewing the road and forward conditions. The shape of the electro-optic assembly 10 should also be selected so as to preserve the basic characteristics of the projected image (i.e., straight lines remain straight, aspect ratios of images are preserved, etc.).

Referring now to FIG. 3, the first substrate 22 includes the first surface 22A and the second surface 22B. The second surface 22B can be coated with indium tin oxide with a sheet resistance of approximately 12 ohms/sq. The first surface 22A can be concave and can be coated with chromium (Cr). The coated first substrate 22 may have a transmission of approximately 37.8% and reflectance of approximately 25.4%. The second substrate 26 defines the third and fourth surfaces 26A, 26B. The third surface 26A can be coated with indium tin oxide with a sheet resistance of approximately 12 ohms/sq.

From the first surface 22A, the electro-optic assembly 10 can have a clear state reflectance of approximately 25% and a transmittance of approximately 24%. The electro-optic assembly 10 can have a low end, or state, transmittance of approximately 10.5% and a low end reflectance from the first surface 22A of approximately 15%. Alternatively, in other examples, the high end, or state, transmittance of the electro-optic assembly 10 may be greater than 45% or even 60%. The characteristics of the electro-optic assembly 10 may also be altered so that the low end transmittance is less than 7.5% or even less than 5% in the darkened state. In some examples, transmittance levels down to 2.5% or less may be desirable. Increasing the high-end transmittance may be obtained by the use of coatings and materials which have low absorption, as will be described below. Lower low-end transmittances may be obtained through the inclusion of materials which have higher absorption. If a wide dynamic range is desired, then low absorption materials may be used in combination with electro-optic materials and cell spacings (e.g., the space between the first and second substrates 22, 26) which attain higher absorbance in the activated state. Those skilled in the art will recognize that there exists a multitude of combinations of coatings and electro-optic materials, cell spacings and coating conductivity levels which can be selected to attain particular device characteristics.

To provide electric current to the first and second substrates 22, 26 and electro-optic medium 38, electrical elements may be provided on opposing sides of the first and second substrates 22, 26 (e.g., the second and third surfaces 22B, 26A) to generate an electrical potential therebetween. In one example, a J-clip may be electrically engaged with each electrical element, and element wires extend from the J-clips to a primary printed circuit board. To provide the greatest surface area through the electro-optic assembly 10, the contacts are located along one side of the device. In this example, there is a back plate and top plate offset to allow contact such as a bus clip. Other contact designs are possible including the use of conductive ink or epoxy.

According to various examples, the electro-optic medium 38 may be an electrochromic medium. In electrochromic examples, the electro-optic medium 38 may include at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES"; U.S. Patent Application Publication No. 2002/0015214 A1 entitled "ELECTROCHROMIC DEVICE"; and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. The first and second substrates 22, 26 are not limited to glass elements but may also be any other element having partially reflective, partially transmissive properties.

According to various examples, a perimeter band of the electro-optic assembly 10 can be modified by adding or removing material to block or obscure the view of the seal 30 and contact materials. In a first example, an outside perimeter of the first and fourth surfaces 22A, 26B can be etched to provide substrates with a frosted perimeter. In frosted perimeter examples, the perimeter band is formed by damaging both the first and fourth surfaces 22A, 26B using a $CO_2$ laser to form a frosted band approximately 4 mm wide. Additionally or alternatively, edges of the first and fourth surfaces 22A, 26B can be ground and/or polished. Further, a spectral filter material (e.g., a chrome or metal ring) or light scattering material may be added to the perimeter of the first and/or second substrates 22, 26 (e.g., any of the first through fourth surfaces 22A-26B) to aid in concealing the seal 30. The spectral filter can block the view of the seal 30 and also provides UV protection for the seal 30. In another example of the spectral filter, chromium oxynitride, or another dark coating, may be deposited on the perimeter of the electro-optic assembly 10 to create a dark ring which acts as the spectral filter. The spectral filter material may be selectively deposited, or may be deposited over the entire surface and then selectively removed, to create the perimeter band, such as with selective laser ablation. Additionally or alternatively, the seal 30 may be generally clear, colorless or configured to scatter light. In such examples, the frosted band can extend slightly inboard of the seal 30. It will be understood that any of the above described techniques of concealing the seal 30 may be used alone, or in conjunction with, any of the other disclosed concealment techniques for the seal 30.

In the depicted example, each of the first and second substrates 22, 26 include a rounded edge 62 and a contact edge 66 that is not rounded. The non-rounded contact edge 66 may be desirable for ease of contact, and if the device is supported by that edge, there would be no need to round the first and second substrates 22, 26 along the contact edge 66. Any exposed edge on the electro-optic assembly 10 may be generally rounded. The radius of curvature of the rounded edges 62 may be greater than approximately 2.5 mm.

Still referring to FIG. 3, the electro-optic assembly 10 may include a transflective coating 70, an antireflection coating 80, and a scratch-resistant coating 90. In the depicted example, the transflective coating 70 is positioned proximate the first surface 22A, but may additionally or alternatively be positioned on the second surface 22B without departing from the teachings provided herein. In the depicted example, the antireflection coating 80 is on the first, third and fourth surfaces 22A, 26A, 26B, but it will be understood that the antireflection coating 80 may additionally or alternatively be positioned on the second surface 22B without departing from the teachings provided herein. In some examples, the antireflection coating 80 is positioned on at least one of the first and second surfaces 22A, 22B, and may be positioned on whichever of the first and second surfaces 22A, 22B is opposite the surface onto which the transflective coating 70 is positioned. The antireflection coatings on the first and third surfaces 22A, 26A, in certain examples, function as electrodes (e.g., an antireflective electrode) to enable darkening of electrochromic medium 38. It will be understood, that when transflective coating 70 is located on the second surface 22B, in certain examples, it may also serve a dual purpose and also act as an electrode. In the depicted example, the scratch-resistant coating 90 is positioned proximate the first and fourth surfaces 22A, 26B. It will be understood that although described as separate layers, the transflective coating 70, the antireflection coating 80 and/or the scratch-resistant coating 90 may share properties which function as the other coatings, as described in greater detail below.

Figure 4A:
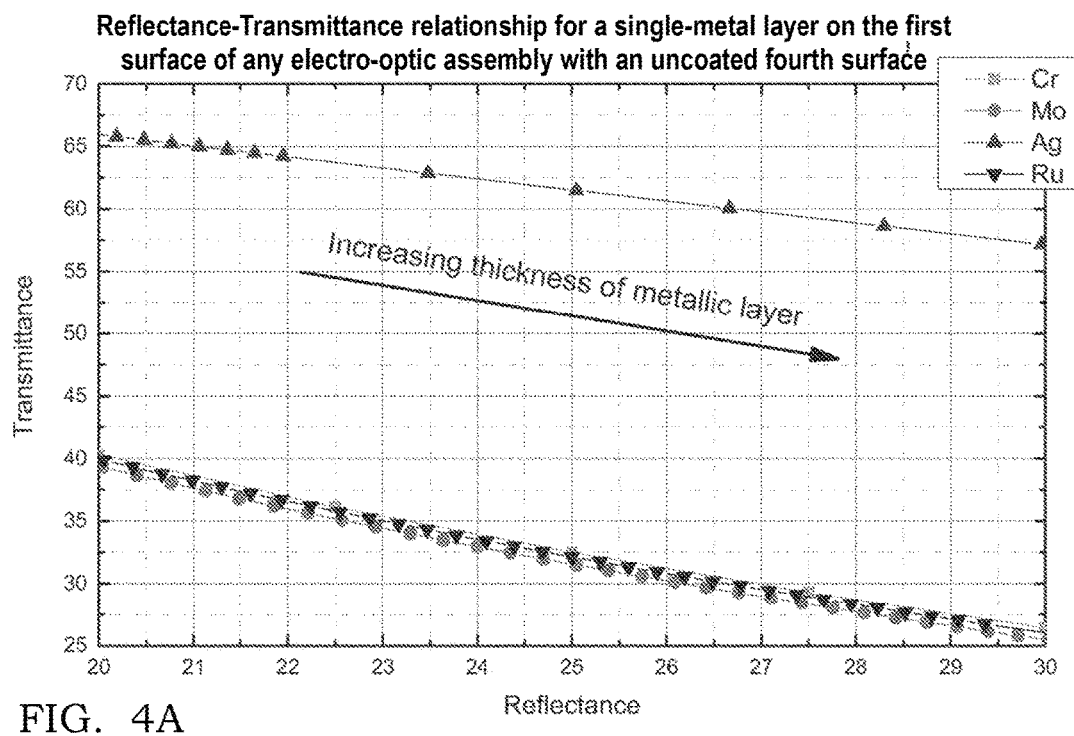
FIGS. 4A and 4B illustrate the eye-weighted transmittance versus reflectance for a single metal layer on the first surface of the electro-optic assembly.
Figure 4B:
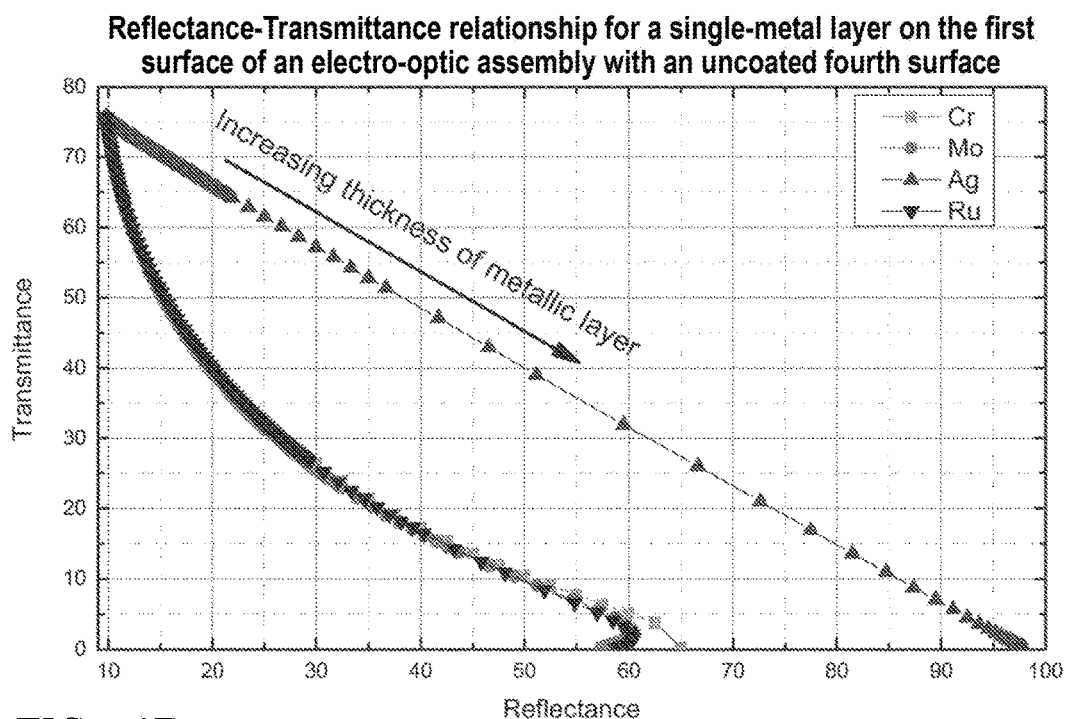
Figure 5:
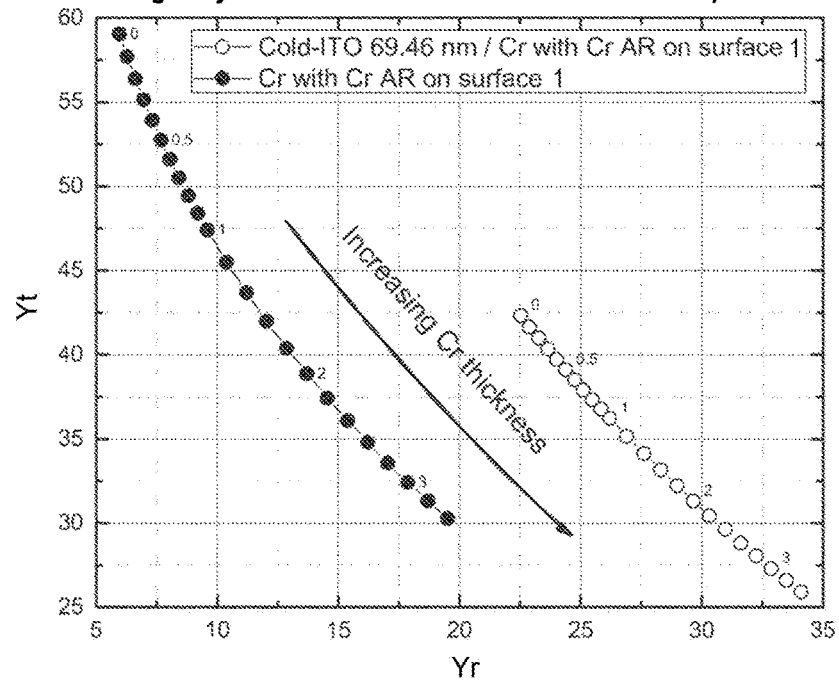
FIG. 5 illustrates the transmittance versus reflectance relationship for a single layer of Cr and a bilayer of ITO/Cr bilayer on the electro-optic assembly first surface.

In a first example, the transflective coating 70 may be a thin metal layer (e.g., a metal-based coating 70) such as Cr or another metal. A potential downside of using a single metal coating layer as the transflective coating 70 is that there is a defined relationship between the reflectance and transmittance which is derived from the thickness of the metal. For example, combinations of reflectance and transmittance are shown in FIGS. 4A and 4B. From the aforementioned FIGS., it can be seen that a single-metal layer does not generally allow for reflectance and transmittance to be independently controlled. In another example of the transflective coating 70, a low absorption layer including a material of lower absorption than the metal, such as indium tin oxide (ITO) or a dielectric material, is located in between the substrate (e.g., the first substrate 22) and the metal coating layer. FIG. 5 depicts attainable transmittance values in dependence of the reflectance for an electro-optic assembly 10 with a single Cr layer and a bilayer of ITO/Cr (e.g., the transflective coating 70) for different values of the Cr layer thickness. This layer increases the range of attainable reflectance and transmittance values for the transflective coating 70 by making it possible to tune the reflectance and reflected color in dependence of the thickness and the refractive index. In order to maximize the reflected intensity, the thickness is chosen to satisfy a condition of constructive interference as given by the following equation:

$$2dn = \left(m + \frac{1}{2}\right)\lambda,$$

where d is the layer thickness, m is the interference order, n is the layer refractive index and $\lambda$ is the light wavelength. For the bilayer case in FIG. 5, the thickness of the ITO (e.g., the low absorption layer) is about 70 nm, which corresponds to m=0 and $\lambda$~575 nm. The refractive index of the low absorption layer may be greater than about 1.3. In this case, the deposition conditions for the ITO were chosen to increase the refractive index of the ITO from a typical 1.8 to about 2.07 at 550 nm and therefore increase the reflectance according to the Fresnel equation at normal angle of incidence:

$$R = \left|\frac{n_1 - n_2}{n_1 + n_2}\right|^2,$$

where $n_1$ and $n_2$ correspond to the refractive indices for the two media of an optical interface. The reflected color can also be tuned slightly by increasing or decreasing the thickness of the low absorption layer. The metal layer may be selected from the metal list provided below and the material of the low absorption layer may be selected from the list of dielectric materials provided below which meet the refractive index properties for this example.

Figure 6:
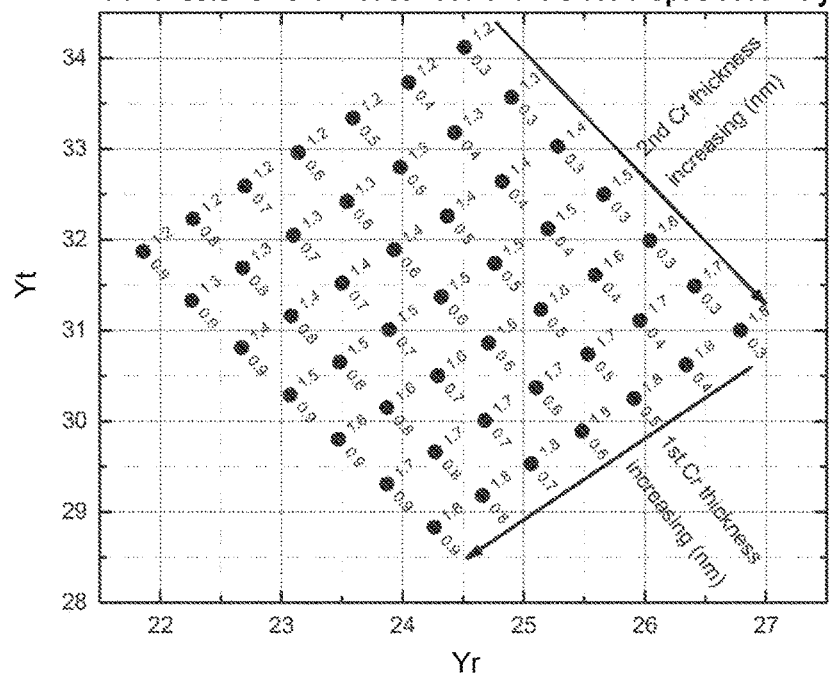
FIG. 6 illustrates the transmittance versus reflectance relationship for a Cr/ITO/Cr multilayer transflector on the electro-optic assembly first surface.

Even though the example of the transflective coating 70 having a dielectric-metal bilayer provides a higher range of attainable values for reflectance and transmission than a single metallic layer, it still may be a challenge to tune the refractive index and absorption of the materials to achieve a particular reflectance and transmission level. Therefore, it may be advantageous to have a transflective coating 70 that allows more flexibility in terms of reflectance and transmittance values, especially when lower transmittance values are sought. Accordingly, in another example of the transflective coating 70, such characteristics can be obtained with a multi-layer coating such as a metal/dielectric/metal structure (MDM). Generally, an M-layer of the MDM coating includes one or more of chromium, molybdenum, nickel, Inconel, indium, palladium, osmium, tungsten, rhenium, iridium, rhodium, ruthenium, stainless steel, tantalum, titanium, copper, gold, platinum, any other platinum group metals, zirconium, vanadium AlSi alloys, and alloys and/or combinations thereof. It will be understood that any of the aforementioned metals may be utilized for the single or bilayer examples of the transflective coating 70. In some examples, combinations of metals and dielectric materials may depend on whether the transflective coating 70 is configured on the first surface 22A or the second surface 22B for durability or electrode properties. The dielectric material may be selected from one or more of the following: ITO, $SnO_2$, SiN, $MgF_2$, $SiO_2$, $TiO_2$, $F:SnO_2$, $NbO_x$, $TaO_x$, indium zinc oxide, aluminum zinc oxide, zinc oxide, electrically conductive $TiO_2$, $CeO_x$, ZnS, chromium oxide, $ZrO_x$, $WO_3$, nickel oxide, $IrO_2$, $NiO_x$, $CrO_x$, $NbO_x$, and $ZrO_x$, or other material with a refractive index between about 1.37 and about 4. It will be understood that any of the aforementioned dielectrics may be utilized for the bilayer example of the transflective coating 70. FIG. 6 depicts the reflectance and transmittance values for a multi-layer transflective structure (e.g., the transflective coating 70) with a Cr/ITO/Cr structure, where the ITO thickness is 74.7 nm. Each point denotes a particular reflectance/transmittance (R/T) value for a combination of $1^{st}$ and $2^{nd}$ Cr layer thicknesses. It is possible to see that these two parameters span a range of transmittance values for a particular reflectance and it is possible to control reflectance and transmission separately in this range. The relationship between the metal layers will change as the thickness and index of the middle low absorption layer changes. The selection of metal will also shift the relationships shown in FIG. 6. In certain embodiments, two different metals may be selected for the top and bottom M-layers and the D-layer may be further subdivided into sub-layers and include materials of different refractive indices. Additional D- and/or M-layers may be added without deviating from the teachings provided herein. The additional layers may be added to improve durability, adhesion or alter the color and/or reflectance and transmittance ranges or robustness.

Figure 7:
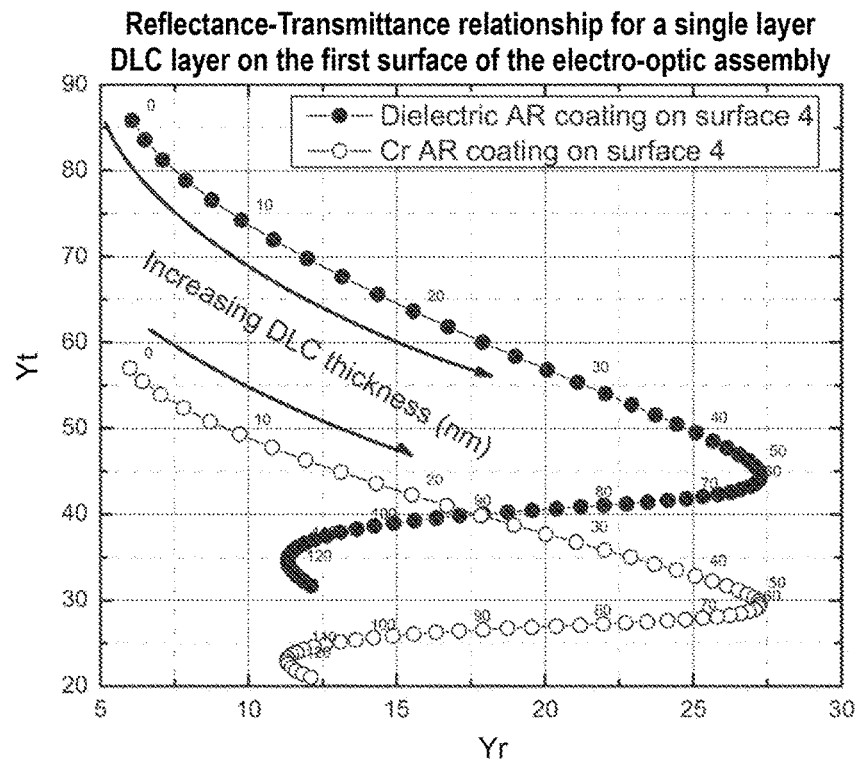
FIG. 7 illustrates the transmittance versus reflectance relationship for a single layer of a diamond-like-carbon (DLC) coating on the electro-optic assembly.
Figure 8:
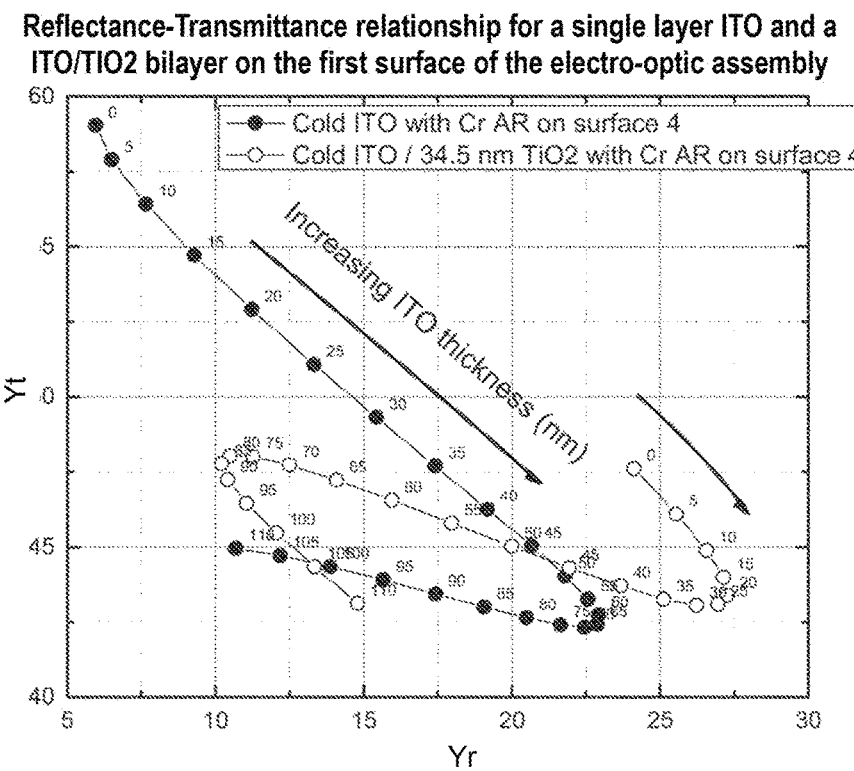
FIG. 8 illustrates the transmittance versus reflectance relationship for a single layer of ITO and an ITO/TiO2 bilayer on the electro-optic assembly first surface.

Alternate materials that provide different R/T values, as found in metals, may be used as the transflective coating 70. Transparent conducting oxides (TCOs) and dielectric layers, along with materials such as $TiO_2$ or diamond-like carbon (DLC), are other options, examples of which are shown in FIGS. 7 and 8 and Table 1.

TABLE 2

Integrated eye-weighted reflectance minima and corresponding transmittance of single layer metallic antireflection coatings on glass.

| Material | Metal layer thickness (nm) | Yr | a*r | b*r | Yt | a*t | b*t | Absorption |
|---|---|---|---|---|---|---|---|---|
| Raw Glass | 0 | 8.43 | −0.23 | −0.95 | 90.71 | −0.33 | 0.27 | 0.86 |
| Chromium | 1.48 | 4.74 | −0.23 | −3.66 | 63.57 | 0.45 | −3.26 | 31.69 |
| Cobalt | 2.02 | 5.59 | −0.08 | −1.37 | 68.88 | −0.27 | −1.36 | 25.54 |
| Iridium | 1.62 | 5.63 | −0.59 | −1.68 | 69.14 | −0.52 | −1.8 | 25.23 |
| Molybdenum | 1.78 | 4.47 | −0.04 | −1.11 | 61.98 | −0.04 | −1.11 | 33.55 |
| MoRe-5 | 1.25 | 4.46 | −0.04 | −0.82 | 61.89 | −0.16 | 1.75 | 33.65 |
| MoTa-5 | 2.18 | 4.58 | −0.04 | −1 | 62.61 | −0.03 | 0.81 | 32.81 |
| MoW-5 | 1.6 | 4.44 | −0.03 | −0.89 | 61.8 | −0.1 | 1.98 | 33.76 |
| Niobium | 2.77 | 4.48 | 0.18 | −1.17 | 62.03 | 1.62 | 2.24 | 33.49 |
| Platinum | 2.13 | 5.42 | −0.1 | −1.04 | 67.75 | −0.62 | −1.4 | 26.83 |
| Rhenium | 1.68 | 4.63 | −0.09 | −0.76 | 62.94 | 0.76 | 4.22 | 32.43 |
| Tantalum | 1.89 | 4.45 | −0.06 | −0.98 | 61.83 | −0.17 | −0.14 | 33.73 |
| Titanium | 3.93 | 4.99 | −0.22 | −1.13 | 65.07 | −1.31 | −0.85 | 29.94 |
| Tungsten | 1.71 | 4.45 | −0.04 | −1.01 | 61.87 | −0.33 | 0.8 | 33.67 |
| Vanadium | 2.08 | 4.5 | 0.38 | −1.24 | 61.16 | 2.01 | 3.11 | 33.34 |

The examples in Table 1 demonstrate the eye-weighted reflectance Yr, transmittance Yt, and absorption of various transflector coatings (e.g., the transflective coating 70) on a glass substrate (e.g., the first surface 22a of the first substrate 22), where the reflectance is understood as the reflectance measured from the coated side of the substrate. The reflectance from the reflecting surface (e.g., the first surface 22A) is greater than about 15%, may be greater than about 20%, may be greater than about 25%, may be greater than about 30%, may be greater than about 35%, may be greater than about 40% and may be greater than about 45%. For instance, the transflective coating 70 with a single layer TCO, such as cold ITO, with a refractive index of about 2.07 at a wavelength of 550 nm, will have a reflectance of about 23% at a quarter wave optical thickness, while the transflective coating 70 with $TiO_2$ with a refractive index of about 2.34 at a wavelength of 550 nm will have a reflectance of about 31.2% at a quarter wave optical thickness. The material and/or refractive index may be selected so that the net reflectance is at the appropriate level. For most materials, the absorption will be relatively low with these materials compared to metals. FIG. 8 depicts modeled values of reflectance and transmittance dependence for the electro-optic element 10 with a single layer ITO and with an $ITO/TiO_2$ bilayer transflective coating 70 in dependence of the ITO thickness. The $TiO_2$ and ITO refractive indices used for the calculations were 2.32 and 2.11 and the thickness for the

TABLE 1

Transmittance and reflectance parameters for various transflective coatings on a glass substrate.

| $1^{st}$ layer | | $2^{nd}$ layer | | $3^{rd}$ layer | | | | | | | | | | |
|---|---|---|---|---|---|---|---|---|---|---|---|---|---|---|
| Material | Thickness (nm) | Material | Thickness (nm) | Material | Thickness (nm) | Yr | a*r | b*r | C*r | CRIr | Yt | a*t | b*t | Absorption |
| Cr | 4.7 | — | 0 | — | 0 | 25.01 | −1.07 | 0.92 | 1.4 | 98.8 | 37.8 | 1.03 | −2.92 | 37.19 |
| ITO | 59.54 | — | 0 | — | 0 | 24.26 | −2.48 | 0.05 | 2.5 | 95.8 | 66 | 1.55 | 4.49 | 9.74 |
| DLC | 41.45 | — | 0 | — | 0 | 26.34 | −1.34 | −0.29 | 1.4 | 97.6 | 51.71 | 1.82 | 8.02 | 21.95 |
| ITO | 35.72 | TiO2 | 34.53 | — | 0 | 26.27 | −1.24 | 6.62 | 6.7 | 97.0 | 66.99 | 0.73 | 0.23 | 6.74 |
| ITO | 69.46 | Cr | 0.77 | — | 0 | 26.39 | −2.12 | 4.89 | 5.3 | 96.7 | 57.79 | 1.36 | 3.18 | 15.82 |
| Cr | 0.9 | ITO | 74.4 | Cr | 1.8 | 24.9 | −1.12 | 2.83 | 3.0 | 98.3 | 45.95 | 0.93 | 2.42 | 29.15 |

TiO$_2$ layer was kept constant at 34.5 nm. These layers enable higher reflectance due to their high inherent refractive indices or constructive interference effects. FIG. 8 depicts modeled values of reflectance and transmission dependence for the electro-optic element 38 having a single layer of diamond-like carbon.

Figure 9:
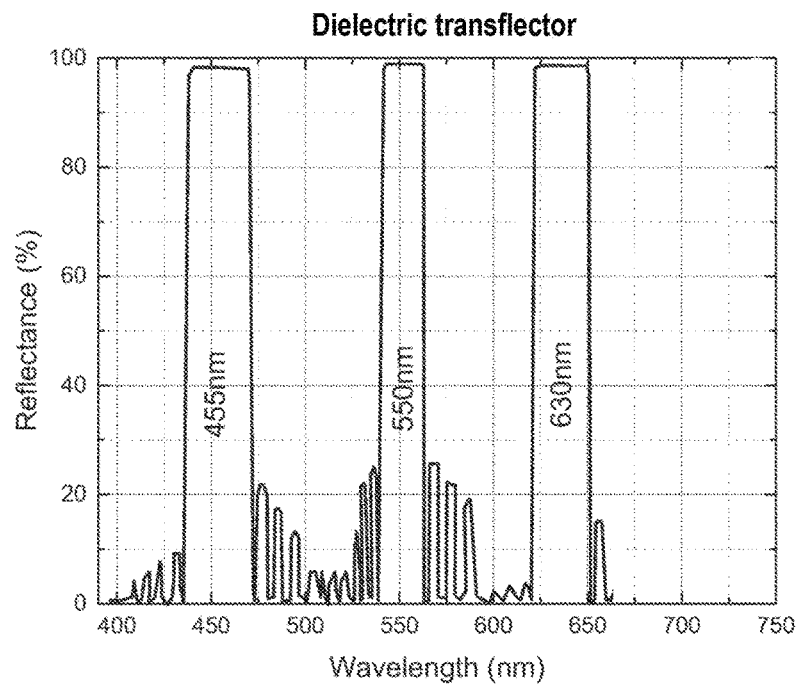
FIG. 9 illustrates the eye sensitivity weighted reflectance in dependence of the thickness of a metallic AR coating.

In another example with high contrast, the transflective coating 70 is based on a spectrally selective dielectric multilayer able to reflect specific wavelengths from the projector 46. FIG. 9 illustrates a graph with the spectral dependence of the reflectance for such a transflective coating 70. In this example, the reflectance is between about 90% and about 100% for wavelengths near 455, 550 and 630 nm. Other reflectance levels are possible and within the scope of this disclosure and the reflectance bands may be centered at different wavelengths as necessary to be compatible with the HUD display output. In some examples, the reflectance at the reflectance bands for the spectrally selective dielectric multilayer is greater than about 35%, greater than about 55% or greater than about 75%. This example of the transflective coating 70 can be manufactured as a sequence of multiple stacks of high H and low L index refractive index layers such as Nb$_2$O$_5$ and TiO$_2$ for H and SiO$_2$ or MgF$_2$ for L.

When reflecting an image, it is important that the color rendering of the electro-optic assembly 10 is correct. The output intensities of the different colors from the projector 46 can be adjusted to compensate for any variations in the reflectance of the transflective coating 70. In some examples, the transflective coating 70 will have relatively consistent reflectance across the visible spectrum. The reflected and transmitted color rendering of the electro-optic assembly 10 can be controlled by varying the thicknesses, layer sequence, and adequate selection of materials of the coatings on each or in some of the first through fourth surfaces 22A-26B. The color rendering can be quantified in a number of ways. The color rendering index, or CRI, of the electro-optic assembly 10 may be greater than about 85, greater than about 90 or greater than about 95. Alternatively, in units of $c^*=\sqrt{(a^{*2}+b^{*2})}$, where $a^*$ and $b^*$ are color parameters of the CIELAB color system, the color of the electro-optic assembly 10 may have a value less than about 20, less than about 10 or less than about 5. Either of these metrics will describe a surface wherein the reflected image's colors will be true or approximately match those of the projector 46. In other examples, the transflective coating 70 can be tuned to match the output of the projector 46 to enhance or compensate to achieve the desired colors.

According to other examples, the transflective coating 70 may include any of the transflective coatings and layers disclosed in U.S. Provisional Patent Application No. 62/205,376, filed on Aug. 14, 2015, entitled "ELECTRO-OPTIC ASSEMBLY," the entire disclosure of which is hereby incorporated herein by reference.

Since the primary reflectance of the heads up display system 14 comes from the transflective coating 70 located on either the first surface 22A or second surface 22B of the electro-optic assembly 10, it is generally important to minimize secondary reflections from the other surfaces (e.g., the first though fourth surfaces 22A-26B where the transflective coating 70 is not present) which may result in a blurry image (i.e., double imaging). Accordingly, use of the antireflection coatings 80 may be advantageous. An example of the antireflection coating 80 may be a transparent conductive oxide. With respect to the examples described herein, the second and third surfaces 22B, 26A may include transparent electrodes. Transparent conducting oxides (TCO) such as ITO, F:SnO$_2$, doped-ZnO, IZO or other layers are commonly used in electro-optic devices, such as electrochromic systems. As noted above, the reflectance of these materials is a function of the thickness of the coatings due to interference effects. A minimum reflectance can be obtained by tailoring the thickness of the conductive oxide coating (e.g., the antireflection coating 80). The minimum reflectance is at a half wave optical thickness. Depending on the wavelengths of the projector 46 of the heads up display system 14, the wavelength for the half wave condition can be adjusted to get the net lowest reflectance value. For example, a reflectance of an ITO coating can be as low as, or lower than, 0.5% from the second and third surfaces 22B, 26A with a layer about 145 nm thick of antireflection coating 80.

As noted above, the half wave thickness of an ITO nets a sheet resistance of about approximately 12 ohms/sq. In some examples, this is not a low enough sheet resistance to get fast and uniform darkening of the electro-optic assembly 10. As such, thicker coating layers (e.g., antireflection coating 80) may be used to attain lower sheet resistance values. In order to maintain minimum reflectance values for the antireflection layer 80, the TCO or ITO needs to be at a multiple of the half wave thickness. For example, the thickness of the antireflection coating 80 can be a full wave, 3 half waves, etc. As the thickness of the antireflection coating 80 moves to higher multiples of half wave coatings, the reflectance is still at a local minimum but is higher than the half wave reflectance. The reflectance off of the second or third surfaces 22B, 26A, with the electro-optic medium 38 having a refractive index of 1.45 and an ITO refractive index of 1.85 is about 0.5%. For an antireflection coating 80 two times a half wave thickness, the reflectance is about 1.25%, and for a coating that is three times a half wave thickness, the reflectance is about 1.7%. As noted above, the reflectance will drop as the refractive index of the ITO is lowered, which can be obtained by making it more conductive. Alternatively, or in combination with the ITO refractive index, the reflectance can also be decreased by increasing the refractive index of the electro-optic medium 38 or the substrate (e.g., the first and/or second substrates 22, 26) medium or the electro-optic medium 38 and the substrate medium. The refractive index of the TCO or ITO examples of the antireflection coating 80 on the second surface 22B and third surface 26A may be less than about 2.0, less than about 1.92, or less than about 1.88. The refractive index of the electro-optic medium 38 may be greater than about 1.2, greater than about 1.4, or greater than about 1.5. The refractive index of the substrate medium may be greater than about 1.4, greater than about 1.6, or greater than about 1.8. The reflectance off of the second and third surfaces 22B, 26A may be less than about 2%.

The tailoring of the reflectance off of the surfaces not having transflective coating 70, such as the first through fourth surface 22A-26B is important for minimizing double images depending on whether the transflective coating 70 is on the first or second surface 22A, 22B. Due to the refractive index of the first and/or second substrates 22, 26 (glass or plastic at about 1.5) and the refractive index of the incident media (air at 1.0), the first and fourth surfaces 22A, 26B have a high reflectance at about 4% and have the highest likelihood of generating objectionable double images. The acceptable reflectance off of the first and fourth surfaces 22A, 26B, as well as the second and third surfaces 22B, 26A, is a function of the materials and their properties which reside between the surface in question and the observer (e.g., the driver). The acceptable absolute reflectance levels may be higher when absorbing materials are present between the surface and the viewer. Therefore the overall absorption is varied in components between the viewer and surfaces in question, the absolute reflectance limits from the first, second, third, and fourth surfaces 22A, 22B, 26A, 26B may be lower when less light is attenuated between the surfaces and the observer, such as when higher dynamic ranges are desired and/or when low reflectance of the first surface 22A is the design goal. The exact allowable reflectance threshold will depend on the details of the heads up display system 14. The reflectance off of the second, third, and fourth surfaces 22B, 26A, 26B may be less than about 2%.

In another example, the antireflection coating 80 may be dielectric antireflection coating such as a S/H/L stack where S is the first or second substrate 22, 26 and H/L may be a stack of multiple layers of alternating materials with high and low refractive indices. Alternatively, the antireflection coating 80 can be a graded coating obtained with a nano-structured, textured surface or other type of graded coating. In such examples, the antireflection coating 80 can be tuned to provide the desired reflectance level along with the desired color reflected from the surface. However, such an example of the antireflection coating 80 can be fragile, and improved antireflection coatings are needed which reduce the reflectance of light observed by the driver but have better durability characteristics.

In another example, the antireflection coating 80 may be added to the fourth surface 26B to minimize the intensity of multiple reflections when viewing the electro-optic assembly 10 from the first surface 22A. The reflectance of the fourth surface 26B can be less than 1%. The heads up display system 14 may operate optimally when the reflectance of the fourth surface 26B is below about 0.5%. For instance, the antireflection coating 80 may include a dielectric antireflection stack having four layers of alternating high and low refractive index materials, where the sequence of the stack is SHLHL, where S stands for the substrate, H stands for the high index material, and L stands for the low index material. The thicknesses of the layers starting from the first layer adjacent to the fourth surface 26B are about 0.0617, 0.0796, 0.4758 and 0.2279 FWOT. Examples of high index dielectric materials are $Nb_2O_5$, $Ta_2O_5$, $TiO_2$ and examples of low index dielectric materials are $SiO_2$ and $MgF_2$. An example of a metallic containing antireflection coating 80 would be a single layer of a metallic material such as Cr, Co, Ir, Mo, Pt, Ta, Zr, W, Re, or Va, with typical thickness between 0.1 and 5 nm. Also, it is important to minimize reflectance from the second and third surfaces 22B, 26A. The reflectance at these surfaces is a function of the refractive indices of the first and second substrates 22, 26, the coating stack on the substrates 22, 26, and the electro-optic medium 38 in contact with the coating stack. The reflectance can also be a function of the coating thicknesses. In the case of a solution phase electrochromic device, using a fluid with a refractive index more closely matching that of the coatings will reduce the reflectance. When using ITO as the electrode for the electro-optic assembly 10, and assuming an ITO refractive index of approximately 1.8, the reflectance normal to the surface of each coating/fluid interface is given by the Fresnel equation provided above. If the fluid has a refractive index of approximately 1.2, the reflectance off of each coating/fluid interface can be approximately 4%. With a fluid having a refractive index of 1.4, the reflectance off of each coating/fluid surface can be approximately 1.6%. The intensity of some of the multiple reflections can be reduced by darkening the electro-optic assembly 10. Although this also reduces forward visibility, there may be times that there is significant advantage to have the electro-optic assembly 10 darken thereby improving contrast and reducing the double imaging. One other consideration is the transmittance of the coatings of the first surface 22A. Lower transmittance reduces the forward visibility, but also reduces the double image off of the second, third and fourth surfaces 22B, 26A, 26B.

Figure 11:
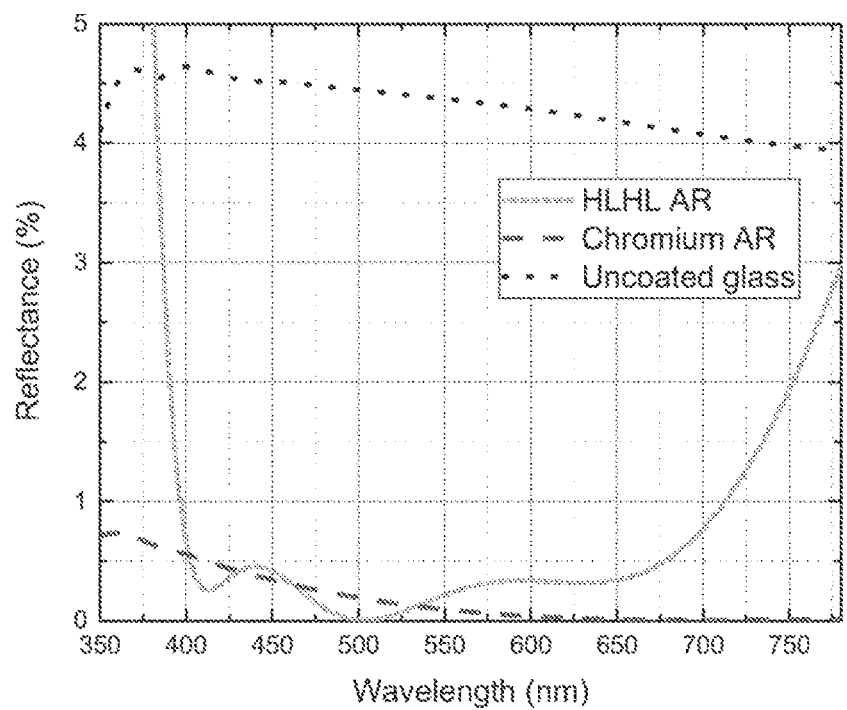
FIG. 11 illustrates the reflectance versus wavelength dependence of a metallic and a dielectric AR coating compared to raw glass.

Unlike other antireflective applications, it is important to note that the problem being solved is not the reflectance, as viewed from the fourth surface 26B, but rather from the reverse direction (e.g., from first surface 22A). Thus, the reflectance as viewed from the fourth surface 26B actually does not have any reflectance constraints. This unique set of requirements can be solved with new antireflection coatings designed based on thin metal layers. Accordingly, in another example, the antireflection coating 80 may include one or more thin metal coatings. It has been discovered that the reflectance of a thin metal coating will vary by the direction viewed. For example, when a Cr coating is applied to a glass substrate (or material with a comparable refractive index), the reflectance from the coating side will steadily increase. This is the normal expected behavior for a metal coating. Conversely, the reflectance, when viewed through the glass, will have an alternate behavior. As the metal coating layer increases thickness, the reflectance drops initially and goes through a minimum before it steadily increases in reflectance, as expected for metal layers. This effect occurs for very thin coating layers. An example of the reflectance in dependence of wavelength in the visible range is illustrated in FIG. 11 for a glass/air interface in the uncoated state, a glass/air interface with a four layer HL antireflection coating, and a glass/air interface with a thin Cr example of the antireflection coating 80. From this, it is possible to observe that the thin metal layer examples of the antireflection coating 80 reduce a dramatic amount of reflectance from the glass, as viewed from the observer perspective. Examples of metallic AR coating would be a single, or multi-layer, of a metallic material such as Cr, Co, Ir, Mo, Pt, Ta, Zr, W, Re, or Va, or alloys containing these elements. The total thickness of the metals layers should be between about 0.1 nm and about 5 nm.

Figure 10:
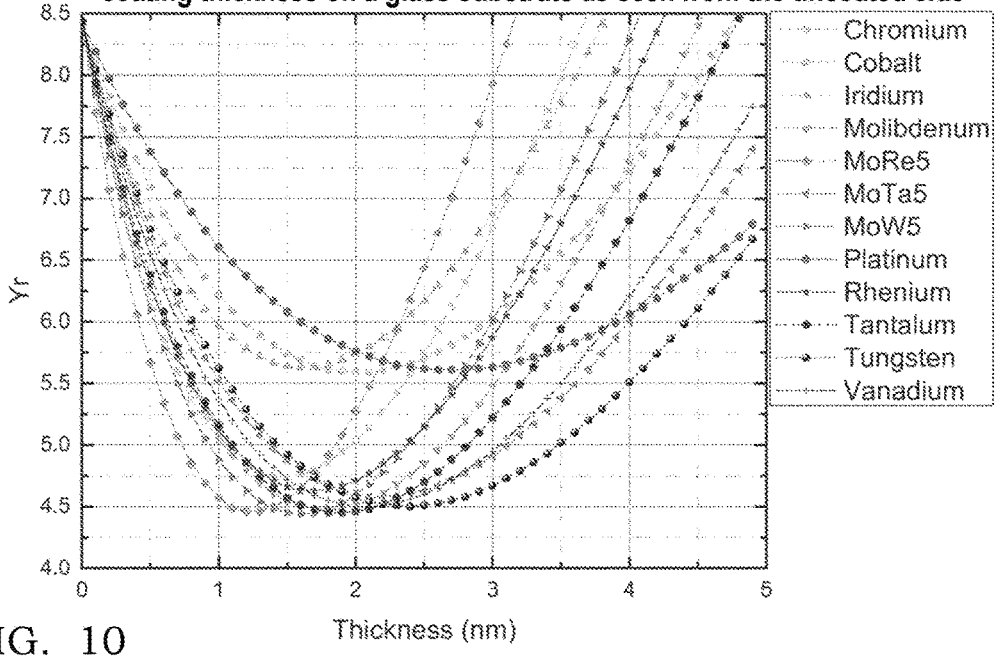
FIG. 10 illustrates the spectral reflectance of a dielectric multi-layer transflective coating.

The eye-weighted reflectance (Yr) versus thickness for several metals (e.g., antireflection coatings 80) when viewed through a substrate (e.g., the first and/or second substrates 22, 26) is illustrated in FIG. 10. In this example the reflectance is presented for the substrate which includes an uncoated surface and an antireflection coated surface. Therefore, the reported reflectance values are relatively high and the net reflectance from the coated surface may be obtained by subtracting about 4.2% from the reported values. From FIG. 10, it is possible to observe that the metals show a characteristic minimum in the reflectance at a thickness between 0.5 and 4.0 nm. Table 2 exemplarily illustrates the normal-incidence integrated eye-weighted reflectance of a glass substrate with a metal example of the antireflection coating 80, as seen from the uncoated glass side. The reflectance from an uncoated glass substrate is also shown in Table 2 for reference.

The examples in Table 3 demonstrate the eye-weighted reflectance Yr, transmittance Yt, and absorption of various electro-optic elements with different transflective coatings 70, TCO coatings and antireflection coatings 80, where the reflectance is measured normally and towards the first surface 22A. The examples illustrate a wide range of transmittance values that are attainable while retaining a similar reflectance of about 25% and neutral reflected color with absolute reflected a* and b* values lower than 3 and C* values less than 3.

TABLE 3

Transmittance and reflectance parameters for various transflective coatings on electro-optic assemblies:

| 1st surface | 2nd and 3rd ITO thickness (FWOT) | 4th surface AR | Yr | a*r | b*r | Yt | a*t | b*t |
|---|---|---|---|---|---|---|---|---|
| G/1stCr/ITO/2ndCr | 0.574 | Cr | 25.09 | −0.48 | 0.07 | 28.91 | −1 | 4.51 |
| G/1stCr/ITO/2ndCr | 1.07 | Cr | 25.16 | 0.42 | 0.14 | 28.8 | −2.42 | 3.2 |
| G/ITO/Cr | 1.07 | Cr | 24.91 | 0.69 | 0.12 | 34.47 | −2.27 | 4.2 |
| G/1stCr/ITO/2ndCr | 2.81 | Cr | 24.72 | −1.85 | 0 | 28.7 | −1.38 | −0.29 |
| G/cold-ITO/Tio2 | 0.574 | Cr | 24.93 | 0.62 | −0.22 | 43.32 | −1.25 | 3.6 |
| G/DLC | 0.574 | Cr | 26.93 | −0.56 | −0.47 | 31.59 | −0.06 | 10.01 |
| G/DLC | 0.88 | Cr | 24.51 | −1.65 | 0.13 | 33.71 | 0.51 | 4.05 |
| G/1stCr/ITO/2ndCr | 0.574 | HLHL | 24.28 | −0.3 | −0.22 | 43.44 | −1.48 | 6.28 |
| G/1stCr/ITO/2ndCr | 1.07 | HLHL | 25.18 | 0.49 | 0.18 | 43.38 | −3.12 | 4.79 |
| G/ITO/Cr | 1.07 | HLHL | 24.95 | 0.8 | 0.18 | 52.28 | −2.95 | 6.01 |
| G/1stCr/ITO/2ndCr | 2.81 | HLHL | 25.56 | −1.37 | 2.53 | 36.98 | −1.86 | −0.11 |
| G/cold-ITO/TiO2 | 0.574 | HLHL | 24.99 | 0.75 | −0.24 | 63.03 | −1.89 | 4.04 |
| G/DLC | 0.574 | HLHL | 26.97 | −0.5 | −0.46 | 45.94 | −0.5 | 11.29 |
| G/DLC | 0.88 | HLHL | 24.95 | −1.64 | 0.32 | 48.46 | 0.25 | 4.55 |

As shown in Table 2, some of the thin metal examples of the antireflection coating 80 may have reflectance values greater than zero for their optimal antireflection situation. This is not uncommon for antireflection coatings 80 as it can be challenging to antireflect over a broad wavelength range. The thin metal antireflection coatings 80 described above can be further improved by the addition of a thin dielectric layer positioned between the substrate (e.g., first substrate 22) and the metal coating layer. Table 4, below, shows the values attainable for chromium metal coating examples of the antireflection coating 80 using thin film models. The reflectance is reduced substantially with the addition of the dielectric layer. The desired thickness and refractive index of this dielectric layer will vary with the metal being used and the requirements of the application. The refractive index of the dielectric layer may be less than about 2.4 or less than about 2.0. The thickness of the dielectric layer may be less than about 50 nm or less than about 35 nm.

TABLE 4

| Sample | Dielectric RI | Dielectric Thickness | Cr Thickness | Reflectance | | | Transmittance | | |
|---|---|---|---|---|---|---|---|---|---|
| | | | | Y | a* | b* | Y | a* | b* |
| 1 | — | — | 1.56 | 4.66 | −0.33 | −3.71 | 65.50 | 0.61 | −3.45 |
| 2 | 1.6 | 32.73 | 1.63 | 4.59 | −0.23 | −3.81 | 64.69 | 0.62 | −3.55 |
| 3 | 1.7 | 31.51 | 1.87 | 4.40 | 0.16 | −3.83 | 61.92 | 0.69 | −3.94 |
| 4 | 1.8 | 22.42 | 2.04 | 4.28 | 0.51 | −3.55 | 60.12 | 0.72 | −4.22 |
| 5 | 1.9 | 22.90 | 2.13 | 4.23 | 0.73 | −3.07 | 59.25 | 0.73 | −4.40 |

The reflectance of the metal or dielectric metal stack examples of the antireflection coating 80 may be further reduced by the modification of the refractive indices of the metal layers. This can be accomplished by the addition of small dopants or additives to the metals such as nitrogen, oxygen, both or other elements. For example, a chromium layer was sputtered with 5% oxygen and 5% nitrogen and the reflectance was 4.24% and 4.25%, respectively. Other levels of gasses may be used in the sputtering atmosphere to change the optical properties of the metals. The percentages of the dopant gas sources can be varied experimentally to optimize the reflectance, as needed. The refractive index relationship described above can be used to guide the optimization of the materials for the desired antireflection properties.

The exposed coatings (e.g., the transflective coating 70 and the antireflection coating 80) on the first and fourth surfaces 22A, 26B may get a buildup of environmental contaminants, or dirt, which is common in an automotive interior. The coatings will therefore be subjected to regular cleaning to have the best images possible. If the coatings are not durable then they may be scratched or otherwise damaged by the cleaning solvents or methods. It therefore may be advantageous for these materials to be durable or a scratch-resistant coating 90 be added. In one example, the transflective coating 70 may be formed by a diamond-like carbon (DLC) material. The DLC materials are reflective, somewhat absorbing and highly durable (e.g., anti-scratch). Examples of the transflective coating 70, including this material, would be stable in an automotive environment. FIG. 7 illustrates the reflectance and transmittance relationship for a single layer DLC on the first surface 22A in dependence of the thickness and of the antireflection coating on the fourth surface 26B. Further, the DLC material may be utilized in the scratch-resistant coating 90. For example, if additional durability is desired for either the thin metal or the other types of antireflection coatings 80 described above, a top DLC layer may be added to the stack as the scratch-resistant coating 90. Since the DLC typically has a relatively high refractive index, the other layers may need to be optimized or adjusted to attain the desired balance between reflectance and durability.

One of the functions of a variable transmittance electro-optic assembly 10 for the heads up display system 14 is to be able to see through the assembly 10 at different transmittance levels to see the environment outside the vehicle 18. In one example, it may be important for the color of the light passing through the electro-optic assembly 10 in the clear and/or darkened states to match light not passing through the assembly 10. In other words, the color rendering index of the transmitted light should be relatively high similar to the reflected CRI discussed herein. The color rendering index of the transmitted light should be greater than about 75, more desirably greater than about 85, even more desirably greater than 90, and most desirably greater than about 95. These values may pertain to the high transmittance state, the low transmittance state and/or intermediate transmittance states of the electro-optic assembly 10. The reflected and transmitted color of the coatings (e.g., the transflective coating 70, antireflection coating 80, and/or scratch-resistant coating 90) along with any absorption present in the materials will play a role in the final CRI values. Similarly, the absorption of the electro-optic medium 38 in the clear and darkened states will factor into the CRI calculation. In some embodiments, the characteristics of the coatings and electro-optic medium 38 may be tuned or adjusted so that the net color has the appropriate CRI. For example, if one or more of the coatings has a blue absorption, then the electro-optic medium 38 may include a yellow absorbing component so that the net transmittance through the electro-optic assembly 10 meets the CRI requirements for a given application.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic assembly configured to be operably connected to a heads up display system of a vehicle, comprising:
   a first substrate comprising;
      a first surface; and
      a second surface;
   a second substrate comprising;
      a third surface; and
      a fourth surface,
   wherein the first substrate and the second substrate are configured to be held in a parallel spaced apart relationship and sealed around a perimeter of the first and second substrates;
   a transflective coating positioned on at least one of the first and second surfaces of the first substrate;
   an antireflective electrode positioned on at least one of the second and third surfaces;
   an antireflection coating positioned on the fourth surface; and
   an electrochromic medium positioned between the second surface of the first substrate and the third surface of the second substrate,
   wherein the electro-optic assembly is configured to reflect an image from a projector of the heads up display system of the vehicle.

2. The electro-optic assembly of claim 1, wherein the transflective coating is positioned on the first surface of the first substrate.

3. The electro-optic assembly of claim 1, wherein the transflective coating is positioned on the second surface of the first substrate.

4. The electro-optic assembly of claim 3, wherein the antireflective electrode comprises indium tin oxide with a thickness about equal to a multiple of the half wave thickness of light from the projector and is positioned on the third surface.

5. The electro-optic assembly of claim 1, wherein the transflective coating has a reflectance of between about 15% and about 45%.

6. The electro-optic assembly of claim 1, wherein the electro-optic assembly has a high state reflectance of approximately 25% and a high state transmittance of at least approximately 24%.

7. The electro-optic assembly of claim 6, wherein the electro-optic assembly has a low end transmittance of at most 10.5%.

8. The electro-optic assembly of claim 1, wherein the first and second substrates are two 1.6 mm glass substrates which are both bent to have a free-form shape.

9. The electro-optic assembly of claim 1, wherein the transflective coating comprises at least one of a spectrally selective dielectric multilayer, a diamond-like carbon coating, a dielectric layer and a dielectric-metal multilayer.

10. The electro-optic assembly of claim 1, further comprising:
a diamond-like carbon coating positioned on the transflective coating.

11. An electro-optic assembly configured to be operably connected to a heads up display system of a vehicle, comprising:
a first substrate comprising:
a first surface; and
a second surface;
a second substrate comprising:
a third surface; and
a fourth surface, the first substrate and the second substrate configured to be positioned in a parallel spaced apart relationship and sealed along a perimeter of the first and second substrates;
a transflective coating positioned on at least one of the first and second surfaces, the transflective coating comprising a low absorption layer and at least a first metal layer; and
an electrochromic medium positioned between the second surface of the first substrate and the third surface of the second substrate,
wherein the reflectance is substantially non-varying,
wherein the electro-optic assembly is configured to control a transmittance from a clear state to a darkened state, and
wherein the electro-optic assembly is configured to reflect an image from a projector of the heads up display system of the vehicle.

12. The electro-optic assembly of claim 11, wherein an antireflection coating is positioned on at least one of the first and fourth surfaces of the second substrate.

13. The electro-optic assembly of claim 12, wherein the antireflection coating is positioned on the fourth surface, the antireflection coating comprising a metal-based antireflection coating.

14. The electro-optic assembly of claim 12, wherein the electro-optic assembly is configured to reflect an image at a reflectance approximately between 15% and 35%.

15. The electro-optic assembly of claim 11, further comprising:
an antireflective electrode on at least one of the second surface and the third surface, the antireflective electrode comprising a transparent conducting oxide (TCO).

16. The electro-optic assembly of claim 11, wherein the electro-optic assembly is configured to control a transmittance from about 24% to about 60% in the clear state.

17. The electro-optic assembly of claim 16, wherein the electro-optic assembly is configured to control the transmittance in the darkened state to less than about 7.5%.

18. The electro-optic assembly of claim 11, wherein at least one of a reflected light and a transmitted light has a color rendering index greater than 85.

19. The electro-optic assembly of claim 11, wherein the transflective coating further comprises a second metal layer, the low absorption layer positioned between the first metal layer and the second metal layer.

20. An electro-optic assembly, comprising:
a substrate defining a first surface and a second surface;
a transflective layer positioned on the first surface of the first substrate, the transflective layer comprising a metal-dielectric-metal (MDM) structure with a reflectance between about 15% and 35%;
a second substrate defining a third surface and a fourth surface;
an antireflective electrode positioned on the second surface of the first substrate and the third surface of the second substrate, the antireflective electrode comprising a transparent conducting oxide;
an antireflection coating on the fourth surface of the second substrate; and
an electrochromic medium positioned between the second surface of the first substrate and the third surface of the second substrate and operable between a clear state and a darkened state,
wherein a reflectance from the antireflection coating and antireflective electrode are each less than 1%,
wherein a clear state transmittance is between about 24% and 45% and a darkened state transmittance is less than about 7.5%, and
wherein the electro-optic assembly is configured to be operably connected to a heads up display system for a vehicle.

21. The electro-optic assembly of claim 20, wherein the antireflection coating includes multiple layers of alternating materials having high and low refractive indices.

22. The electro-optic assembly of claim 21, wherein the antireflection coating comprises a dopant.

23. The electro-optic assembly of claim 22, wherein the first surface of the first substrate and the fourth surface of the second substrate are configured to have a rounded edge.

* * * * *